United States Patent Office 2,776,984
Patented Jan. 8, 1957

2,776,984

PROCESS FOR IMPROVING CHARACTERISTICS OF PLASTICIZERS AND PRODUCTS THEREFROM

Maurice Mention and Pierre Bourguignon, Melle, France, assignors to Les Usines de Melle (Societe Anonyme), Saint-Leger-les-Melle, France, a corporation of France No Drawing. Application February 20, 1953, Serial No. 338,161

5 Claims. (Cl. 260—475)

This invention relates to a process for improving the characteristics including especially the electrical characteristics of plasticizers, and resulting products.

In manufacturing electric cables it is important that the insulating coating thereof should have very high electrical resistance to avoid losses of power. Where vinyl resins, for example vinyl chloride resins, are employed in the manufacture of such cables a stabilizer and plasticizer are employed. The proportion of the plasticizer used is high and accordingly it is necessary that the resistivity of such plasticizer be correspondingly high. Octyl phthalate and octyl- or nonyl-sebacates are most frequently employed. In addition to the requisite that such plasticizers have a high electrical resistivity it is important that they have little color and contain minimum amounts of acidity and moisture.

The resistivity of such esters has been found to vary widely, due apparently to the process of producing and purifying the ester whereby impurities occur in such products causing the variations mentioned.

The principal object of the present invention accordingly is to provide a simple and efficient process for the treatment of ester plasticizers of the kind mentioned which results in the improvement of their characteristics and especially to increase their electrical resistivity and to decrease their color, acidity and water content.

The invention accordingly comprises the novel products as well as the novel processes and steps of processes according to which such products are manufactured, the specific embodiments of which are described hereinafter by way of example and in accordance with which we now prefer to practice the invention.

We have found in accordance with our invention that improvement of the characteristics of an ester plasticizer including increase in the electrical resistivity can be effected by bringing such plasticizer in contact with alumina. The ester plasticizer may be, for example, a dibasic acid ester in which the hydrogens of the acid groups are substituted by aliphatic, preferably alkyl, chains of at least six carbon atoms. Examples of such esters are, but without limitation, hexyl phthalate, octyl phthalate, octyl sebacate, nonyl sebacate, octyl adipate, nonyl adipate, and the like. The alumina is preferably activated alumina, that is alumina which has been previously suitably heated. Thus under the same operating conditions if bauxite increases the resistivity by 2½ times, such resistivity will be multiplied by seven under the action of dried aluminum oxide and by fifteen under the action of activated alumina such as "Activalum" from Société d'Electro-Chimie, d'Electro-Métallurgie et des Aciéries électriques d'Ugine. Such material is prepared by heating aluminum oxide to about 300° C. The plasticizer is brought in contact with the alumina and when recovered has improved characteristics.

The alumina should be contacted with the plasticizer at a temperature at which the plasticizer is sufficiently fluid, usually in the range 20–200° C. Best results are obtained at about 60–80° C. The process of the invention may be carried out discontinuously by suspending particles of alumina throughout the liquid plasticizer and stirring the mixture while heating it for a sufficient time. For efficient treatment powdered alumina is employed in the proportion of 10–30% of the weight of the liquid plasticizer to be treated. The longer the time of contact, the more efficient the treatment. However, a time of contact of about 15 minutes produces an increase of electrical resistivity close to the maximum possible.

Alternatively our process may be carried out continuously. The preferred mode of operation consists in arranging one or more bodies or beds of granular alumina in a vessel to which the plasticizer, previously heated, is continuously fed. It passes through the bed or beds of alumina and when collected has improved electrical properties. The temperature should, in practice, be the same as in batch operation, viz 20–200° C., and more particularly 60–80° C. In continuous operation the choice of the working temperature should depend especially upon the viscosity of the plasticizer, the temperature being chosen high enough to diminish the viscosity so that the loss of head throughout the bed or beds of alumina permits contact in the time required.

Generally systems known in the art of putting a liquid into contact with a divided solid may be used to carry out our process.

The losses of head depends also upon the size of the alumina particles. The finer the particles, the more considerable is the loss of head and consequently the higher should be the temperature and the thinner the bed. In practice 60–100 mesh granular alumina (that is, granular alumina whose particles can be sifted through a screen having 60 meshes per French inch of 27 mm. but not through a screen having 100 meshes per French inch) is preferably employed as it allows much latitude in the choice of the shape of apparatus. The latter may be either of the Keller type, that is having a large surface and a small height, or of the column type, that is having a small section and great height. As a matter of fact we have found that irrespective of the point of loss of head the shape of the apparatus has no influence on the result of the treatment as regards either the electrical resistivity or the decolorization or other secondary advantages. The time of contact of the plasticizer with the alumina is an important factor. In continuous operation the time of contact may be expressed by the ratio of the volume of plasticizer passed per hour through the alumina to the volume of alumina in use. Satisfactory results are obtained by passing per hour an amount of plasticizer of 4 times the volume of alumina, this representing a time of contact of 15 minutes, but the results are close to the maximum possible when the volume passed amounts to 0.5–1 time the volume of alumina, which represents a time of contact of between 2 hours and 1 hour.

It is of primary interest to apply our process to plasticizers which already have a high resistivity. The more interesting plasticizers of that kind are the esters formed by aliphatic or aromatic dicarboxylic acids having 6 to 10 carbon atoms with aliphatic alcohols having 6 to 10 carbon atoms such, for example, as octyl phthalate, hexyl phthalate, octyl sebacate, nonyl sebacate, octyl adipate and the like. The process of production of those esters has no influence on the final result in increasing the resistivity, nor does any purifying treatment which the esters could have undergone with a view to freeing them as far as possible of any excess alcohol, water, acidity or color. Thus, an alkyl phthalate which has already been decolorized by passage over activated carbon may be subjected to our process whereby its resistivity—which had not been altered by the activated carbon—is considerably increased. Likewise we may subject to our process products which have been distilled or else products which have been treated by hydrogenation.

The following examples illustrate the manner in which we now prefer to carry out the process of the invention. It is to be understood that the invention is not restricted to the examples except as indicated in the appended claims. In these examples the color was measured by means of a Lovibond tintometer having a 6-inch cell.

Example 1

A column of 25 cm. in diameter and 265 cm. high was filled with 60–100 mesh granular activated alumina ("Alumine gammagel électro U" from Ugine).

We passed through the column, at 80° C., 50 liters per hour of octyl phthalate having the following characteristics:

Before treatment:
- Resistivity _____ $1.8 \times 10^5$ megohms/cm./cm.$^2$ at 20° C.
- Color _____ 5 Yellow (Y)+1.6 Red (R).
- Water content _____ 0.8 gram per liter.
- Acidity _____ 0.0003 mole per liter.

The product after passage through the column had the following characteristics:

After treatment:
- Resistivity _____ $10 \times 10^5$ megohms/cm./cm.$^2$ at 20° C.
- Color _____ 2.2 Y+0.6 R.
- Water content _____ Below 0.1 g/1.
- Acidity _____ 0.0001 mole per liter.

Example 2

We introduced into a balloon having a stirring device, 1 liter of octyl phthalate and 200 cm.$^3$ of dried aluminum oxide, the characteristics of the phthalate being as follows:

Before treatment:
- Resistivity _____ $0.5 \times 10^5$ megohms/cm./cm.$^2$ at 20° C.
- Color _____ 6 Y+1.5 R.
- Water content _____ 0.8 g/1.
- Acidity _____ 0.0002 mole per liter.

We stirred 15 minutes at 60° C., after which the properties of the phthalate were as follows:

After treatment:
- Resistivity _____ $4 \times 10^5$ megohms/cm./cm.$^2$ at 20° C.
- Color _____ 2.9 Y+0.8 R.
- Water content _____ 0.2 g/1.
- Acidity _____ 0.0001 mole per liter.

Example 3

We filled the column of Example 1 with activated alumina of the type "Activalum" from Ugine and we passed through the column, at 60° C., 30 liters per hour of octyl sebacate having the following characteristics:

Before treatment:
- Resistivity _____ $3.5 \times 10^5$ megohms/cm./cm.$^2$ at 20° C.
- Color _____ 4.9 Y+1.3 R.
- Water content _____ 0.8 g/1.
- Acidity _____ 0.0007 mole per liter.

The product after passage through the column had the following characteristics:

After treatment:
- Resistivity _____ $45 \times 10^5$ megohms/cm./cm.$^2$ at 20° C.
- Color _____ 0.4 Y+0. R.
- Water content _____ 0.15 g/1.
- Acidity _____ 0.0002 mole per liter.

Example 4

Through the same column, filled with the same alumina as in Example 3, we passed, at 70° C., 50 liters per hour of nonyl adipate having the following characteristics:

Before treatment:
- Resistivity _____ $3.2 \times 10^5$ megohms/cm./cm.$^2$ at 20° C.
- Color _____ 2.0 Y+0.4 R.
- Water content _____ 0.75 g/1.
- Acidity _____ 0.0009 mole per liter.

The characteristics of the product after passage through the column were as follows:

After treatment:
- Resistivity _____ $21 \times 10^5$ megohms/cm./cm.$^2$ at 20° C.
- Color _____ 0.8 Y+ 0.1 R.
- Water content _____ 0.1 g/1.
- Acidity _____ 0.00015 mole per liter.

For facilitating the passage of the product through the alumina it is within the scope of our invention to establish a difference in pressure between the top and the bottom of the column, by means either of an overpressure, upstream, or of an underpressure, downstream.

Example 5

It is possible after use to re-activate the alumina. After passage over the alumina of an amount of plasticizer, for example corresponding to 80–300 times the volume of alumina, according to the quality of the plasticizer, the alumina loses its efficiency and should be re-activated. This can be done preferably by passing acetone through the alumina, at a temperature of the order of 50° C., until the color of the acetone after passage is only of 0.1 Yellow. Ordinarily this operation requires the use of 3–4 volumes of acetone for 1 volume of alumina. The acetone remaining in the apparatus after the re-activation operation may be removed by passing a stream of hot air through the alumina.

Example 6

We introduced into the balloon of Example 2, 1 liter of 2-ethylhexanoic ester of triethylene-glycol and 200 cm.$^3$ of the same activated alumina as in Example 1. The characteristics of the ester were as follows:

Before treatment:
- Resistivity _____ $0.04 \times 10^5$ megohms/cm./cm.$^2$ at 20° C.
- Color _____ 14 Y+1.6 R.
- Water content _____ 0.9 g/1.
- Acidity _____ 0.005 mole per liter.

We stirred 20 minutes at 60° C., after which the properties of the ester were as follows:

After treatment:
- Resistivity _____ $0.07 \times 10^5$ megohms/cm./cm.$^2$ at 20° C.
- Color _____ 8Y+1.2 R.
- Water content _____ 0.25 g/1.
- Acidity _____ 0.002 mole per liter.

What we claim is:

1. A process which comprises bringing alumina into contact with an ester plasticizer, said plasticizer being an ester formed from an acid selected from the group consisting of monocarboxylic aliphatic acids, dicarboxylic aliphatic acids and dicarboxylic aromatic acids and from an alcohol selected from the group consisting of mono- and di-hydric aliphatic alcohols, each of said acids and alcohols containing 6–10 carbon atoms in their respective chains and rings, at a temperature of 20 to 200° C., for at least about 15 minutes, the proportion by weight of alumina brought into contact with the plasticizer being at least about 10%, and separating the alumina and plasticizer and recovering the plasticizer having improved characteristics including increased electrical resistivity.

2. A process in accordance with claim 1 in which the liquid plasticizer is stirred with 10–30% of its weight of alumina suspended therein.

3. A process in accordance with claim 1 in which the liquid plasticizer is continuously passed through a mass of alumina.

4. A process in accordance with claim 1 in which activated alumina is employed.

5. A process which comprises bringing alumina into contact with an ester plasticizer, said plasticizer being an ester formed from an acid selected from the group consisting of monocarboxylic aliphatic acids, dicarboxylic aliphatic acids and dicarboxylic aromatic acids and from an alcohol selected from the group consisting of mono- and di-hydric aliphatic alcohols, each of said acids and alcohols containing 6–10 carbon atoms in their respective chains and rings, at a temperature of 20 to 200° C., for at least about 15 minutes, the proportion of said alumina brought into contact with the plasticizer being at least about 25% by volume with respect to said plasticizer, and separating the alumina and plasticizer and recovering the plasticizer having improved characteristics including increased electrical resistivity.

References Cited in the file of this patent

UNITED STATES PATENTS

| | | |
|---|---|---|
| 2,325,951 | Gresham | Aug. 3, 1943 |
| 2,370,280 | Yngve | Feb. 27, 1945 |
| 2,411,807 | Riesmeyer | Nov. 26, 1946 |
| 2,502,371 | Darby | Mar. 28, 1950 |
| 2,535,643 | Mack | Dec. 26, 1950 |
| 2,604,379 | Archibald | July 22, 1952 |